United States Patent [19]
Inoue et al.

[11] Patent Number: 5,808,432
[45] Date of Patent: Sep. 15, 1998

[54] METHOD OF AND APPARATUS FOR FINELY MACHINING A WORKPIECE WITH NUMERICAL CONTROL HAVING A COMPUTER-AIDED SIMULATED FUNCTION

[75] Inventors: Takao Inoue; Takeshi Masaki, both of Hirakata; Taiziro Yosioka, Nara-ken; Masahiro Muro, Neyagawa, all of Japan

[73] Assignee: Matsushita Electric Industrial Co., Ltd., Osaka-fu, Japan

[21] Appl. No.: 788,842

[22] Filed: Jan. 27, 1997

Related U.S. Application Data

[63] Continuation of Ser. No. 401,897, Mar. 10, 1995, abandoned.

[30] Foreign Application Priority Data

Mar. 11, 1994 [JP] Japan ..................................... 6-041237

[51] Int. Cl.⁶ .................................................. G06F 19/00
[52] U.S. Cl. ........................... 318/561; 318/565; 318/563; 318/569; 318/568.24; 364/474.15; 364/474.17; 364/474.19; 364/474.21
[58] Field of Search ..................... 318/560–574; 364/474.01–474.37

[56] References Cited

U.S. PATENT DOCUMENTS

| | | | |
|---|---|---|---|
| 4,697,239 | 9/1987 | Sicard et al. | 364/468.2 |
| 4,713,770 | 12/1987 | Hayes et al. | 364/474.17 |
| 4,742,464 | 5/1988 | Duret et al. | 364/474.24 |
| 4,833,617 | 5/1989 | Wang | 364/474.15 |
| 5,030,920 | 7/1991 | Nakamura | 324/721 |
| 5,033,014 | 7/1991 | Carver et al. | 364/571.01 |
| 5,072,399 | 12/1991 | Laws et al. | 364/474.29 |
| 5,101,363 | 3/1992 | Rutkowski | 364/578 |
| 5,122,966 | 6/1992 | Jansen et al. | 364/474.2 |
| 5,161,922 | 11/1992 | Malloy | 408/14 |
| 5,208,763 | 5/1993 | Hong et al. | 364/474.34 X |
| 5,257,204 | 10/1993 | Sawada et al. | 364/474.24 |
| 5,309,366 | 5/1994 | Grenkowitz | 364/474.24 |
| 5,351,196 | 9/1994 | Sowar et al. | 364/474.24 |
| 5,407,265 | 4/1995 | Hamidieh et al. | 340/680 |
| 5,458,825 | 10/1995 | Grolman et al. | 364/476 X |
| 5,466,360 | 11/1995 | Son et al. | 318/727 |
| 5,478,301 | 12/1995 | Takahashi | 483/11 |
| 5,526,272 | 6/1996 | Kondo et al. | 364/474.2 |
| 5,584,016 | 12/1996 | Varghese et al. | 364/468.03 |
| 5,586,052 | 12/1996 | Iannuzzi et al. | 364/512 |
| 5,621,648 | 4/1997 | Crump | 364/468.19 |
| 5,691,909 | 11/1997 | Frey et al. | 364/474.01 |

FOREIGN PATENT DOCUMENTS

| | | |
|---|---|---|
| 0513369 | 11/1992 | European Pat. Off. . |
| 4105096 | 8/1991 | Germany . |

*Primary Examiner*—Brian Sircus
*Attorney, Agent, or Firm*—Wenderoth, Lind & Ponack, L.L.P.

[57] ABSTRACT

A machining program is prepared based on design data obtained by CAD and machining conditions stored in advance in a data base, while machining status information is obtained from a machining site. Based on the machining program and the machining status information, a machining status is simulated in order to subsequently prepare machining commands required for appropriate NC control.

16 Claims, 8 Drawing Sheets

TARGET
SHAPE

Fig. 7

SEGMENT

INTERRUPT
ENABLE
POINT

Fig.9 PRIOR ART

METHOD OF AND APPARATUS FOR FINELY MACHINING A WORKPIECE WITH NUMERICAL CONTROL HAVING A COMPUTER-AIDED SIMULATED FUNCTION

This application is a continuation of now abandoned application, Ser. No. 08/401,897, filed on May 10, 1995.

BACKGROUND OF THE INVENTION

1. Field of the Invention

The present invention relates to a method of and an apparatus for finely machining a workpiece using a numerical control having a computer-aided simulation function. The method and apparatus of the present invention are suited for machining a very small workpiece having a size less than, for example, one millimeter.

2. Description of Related Art

Figure 9:
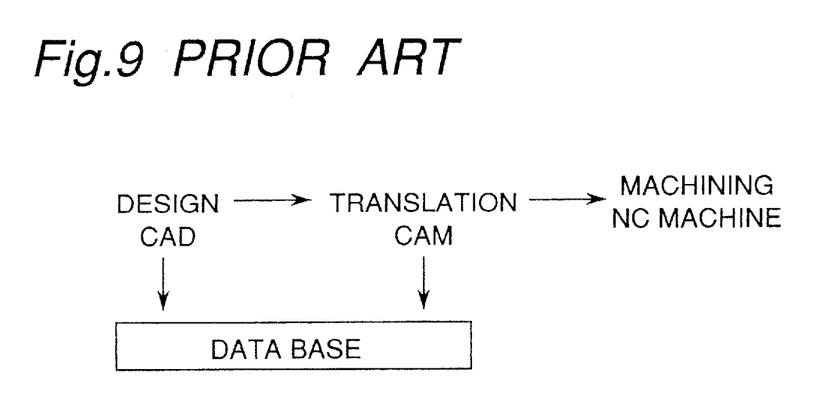
FIG. 9 is a schematic diagram explanatory of a conventional method.

When cutting machining or electrical discharge machining is executed at an NC machining center, the conventional practice is such as shown in FIG. 9 wherein design data obtained by CAD are converted into machining information with CAM, and the machining information is then transmitted to the machining center in either an on-line mode or an off-line mode for subsequent machining.

However, if a very small workpiece having a size less than one millimeter is machined using the conventional method referred to above, even very small substances such as, for example, crystalline particles of the workpiece or impurities, which have hitherto caused no problems, may affect the progress of machining. For this reason, some problems arose in that machining instructions under only open-loop control cannot satisfactorily proceed the machining as designed in advance, in that the conventional visual observation is not possible due to the minute size of the shape, and in that no correction is possible in the course of the machining. Although it is conceivable that upon removal of the workpiece from the NC machine, the workpiece be measured for subsequent remachining, such measurement cannot be easily carried out because the working area is very small.

SUMMARY OF THE INVENTION

The present invention has been developed to overcome the abovedescribed disadvantages.

It is accordingly an objective of the present invention to provide a method of finely machining a workpiece using a numerical control having a computer-aided simulation function. The method of the present invention enables visual observation during machining even with respect to very small workpieces, which one less than one millimeter, in size for example and can discover abnormal symptoms by sensing machining sounds.

Another objective of the present invention is to provide the method of the above-described type which can easily modify machining conditions even during the process of machining.

A further objective of the present invention is to provide an apparatus for effecting the method referred to above.

Figure 1:
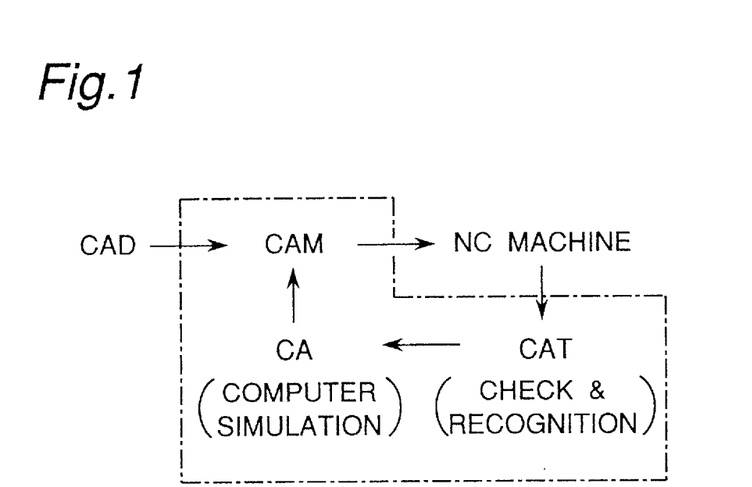
FIG. 1 is a schematic diagram explanatory of the method of the present invention.

In accomplishing the above and other objectives, the method of the present invention is schematically depicted in FIG. 1 and is intended to simulate the machining status by checking and recognizing machining status information from a machining site where an NC machine works. The result of simulation is reflected in machining commands executed with CAM.

More specifically, the method of the present invention includes preparing a machining program based on design data which is obtained by CAD and machining conditions stored in advance in a data base. The method also includes obtaining machining status information from a machining site and simulating a machining status based on the machining program and the machining status information. Further, the method includes preparing machining commands based on the machining program and a result of simulation and executing an NC control based on the machining commands.

In preparing the machining program, it is preferred that the machining status information from the machining site is referred to. Also, it is preferable to minimize the excess thickness that requires further machining by referring to at least one of tool shape information employed as one of the machining conditions and 2.5- or 3-dimensional information indicative of the shape of the workpiece during machining.

Advantageously, the method of the present invention further comprises the step of diagnosing abnormal conditions based on the machining status information or reshaping a machine tool based on the machining status information obtained from the machining site.

The machining status information includes at least one of sound information obtained from the machining site, information indicative of a drive current required to drive an NC machine, information indicative of the shape of the workpiece, and information indicative of the shape of the machine tool.

The apparatus of the present invention includes a machine tool for machining a workpiece, a drive means for driving the machine tool, an NC control means for controlling the drive means, a display and instruction means having a display function and an instruction function, and a control shell for collectively controlling the machine tool, the drive means, the NC control means, and the display and instruction means. The display and instruction means selectively displays design data obtained by CAD, machining conditions, a machining program, machining status information obtained at the machining site, a result of simulation executed by the control shell, and instructions given to the control shell.

Conveniently, the control shell is a multitasking control shell and includes a task of converting the design data obtained by CAD into NC control information, a task of referring to machining condition information stored in advance in a data base, and a task of preparing the machining program based on the machining condition information and the NC control information. The multitasking control shell also has a task of obtaining the machining status information from the machining site, a task of simulating a machining status based on the machining status information and on the machining program, a task of preparing machining commands required for NC control based on a result of simulation and on the machining program, and a task of controlling the drive means in accordance with the machining commands.

Conveniently, the control shell further has a task of diagnosing abnormal conditions during machining based on the machining status information.

Advantageously, the apparatus includes a reshaping means for reshaping the machine tool based on the machining status information obtained from the machining site.

Again advantageously, the apparatus further includes at least one of the following a sound monitor for detecting sound information at the machining site; an ammeter for obtaining drive current information of the drive means; and a shape recognition means for obtaining shape information indicative of at least one of the workpiece and the machine tool. The shape recognition means may be a video camera, a laser microscope, a 3-dimensional digitizer or the like.

The machining to which the present invention is applied is such as, for example, cutting machining or electrical discharge machining.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

Figure 2:
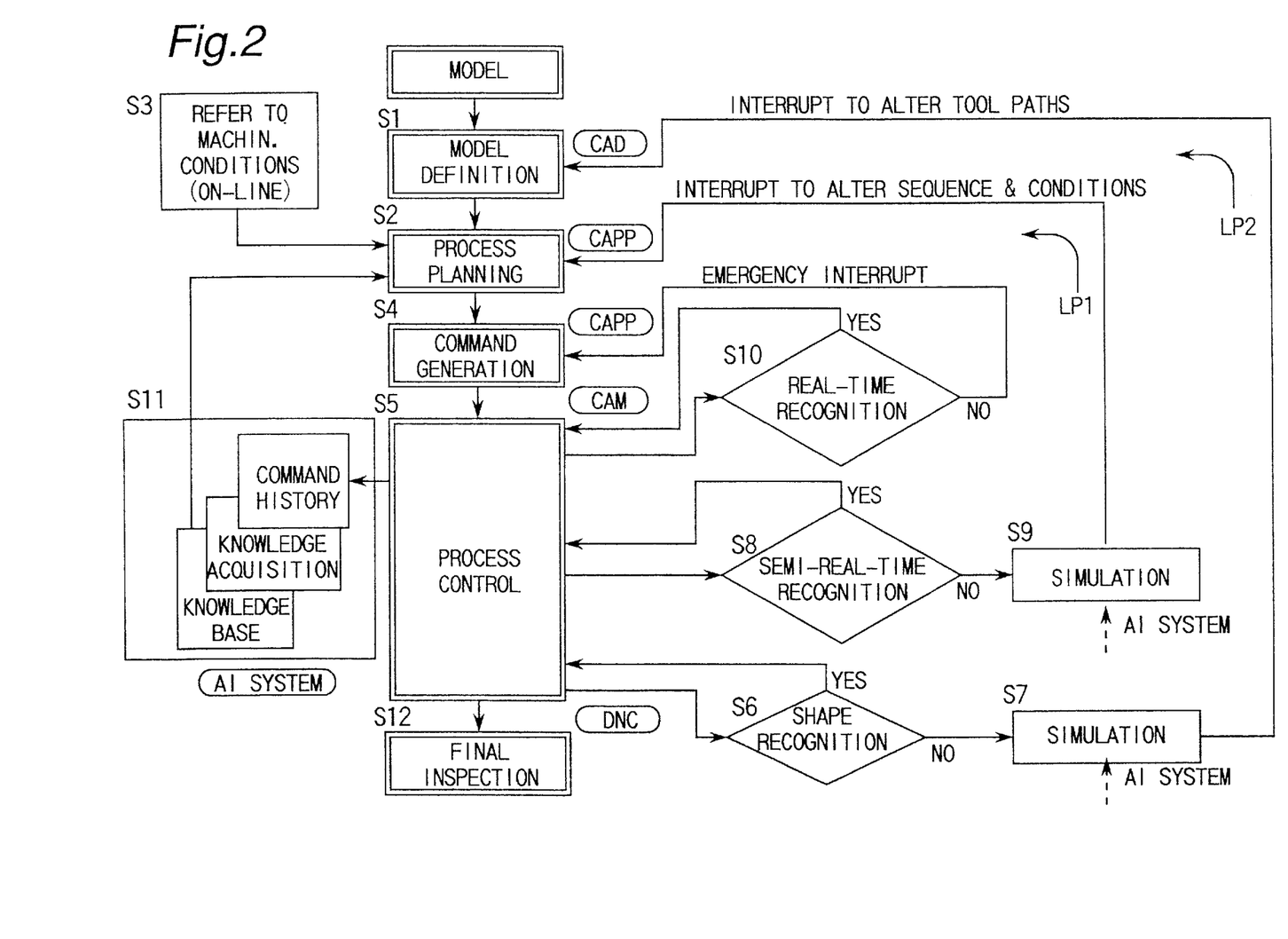
FIG. 2 is a flowchart illustrating the method of the present invention.

Referring now to the drawings, there is shown in FIG. 2 a flowchart illustrating a machining method according to the present invention. As is the case with the conventional method, a drawing is prepared with CAD, and design data indicative of a solid figure obtained by CAD are converted by CAM into machining commands required for working a machine tool. The machining commands are in turn introduced into an NC system of a machining apparatus.

More specifically, as shown in the flowchart of FIG. 2, based on a drawing, image or the like indicative of the profile of a desired target object, the shape into which a workpiece is to be eventually machined is prepared at step S1 using a shape preparing function of CAD. Although this process is generally interactively executed, information of a given format can be fetched from any other CAD systems via an interface. Other shapes during machining are also prepared at step S1.

At step S2, the process planning, which includes machining sequence and machining conditions, is set. In the case of forming a round hole or a slit, setting is carried out for each machining. On the other hand, in the case of forming an object having a 2.5-dimensional shape by machining, individual wire frame elements indicative of contour lines thereof are looped for continuity and directivity required for subsequent machining and are segmented to allow interruption (segmentation).

Although a machining program is prepared by setting appropriate tool paths according to the size of a machine tool such as, for example, an electrode, the machining conditions stored in a data base can be referred to at step S3. It is to be noted here that the machining conditions used throughout this specification mean predetermined conditions such as, for example, the shape of the machine tool, machining speed, depth of cut, and the like.

Figure 3:
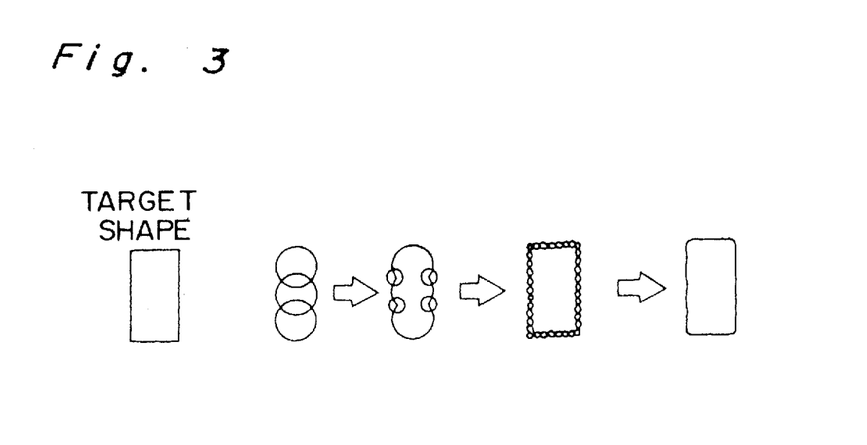
FIG. 3 is a schematic view illustrating the machining processes of forming a rectangular opening.

In the process planning, it is preferred that the setting be carried out so as to minimize the excess thickness that requires further machining by referring to information on the tool shape employed as one of the machining conditions or by referring to 2.5- or 3-dimensional information on the shape of the workpiece or tool during machining. By way of example, as shown in FIG. 3 which illustrates machining processes of forming a rectangular opening, three round holes are first formed using a large-diameter tool. Then, four overlap points are machined using a middle-diameter tool and, finally, the still rugged internal surface of the opening is machined using a small-diameter tool.

Thereafter, based on the machining program prepared at step S2, machining commands required for driving the machine tool are generated at step S4, and drive control of the NC machine is executed at step S5.

At step S6, based on image information obtained at the machining site, a determination is made whether the shape of the workpiece recognized during machining is acceptable. If the shape of the workpiece is within the permissible range, the control of step S5 is continued. In contrast, if the shape of the workpiece is not permissible, an interrupt processing is executed to alter the tool paths. More specifically, at step S7, the NC system fetches from an AI system (data base) information on the shape of a new machine tool that may be preferably used in place of the machine tool now used. Then, simulation is executed to predict the result of machining with the new machine tool based on a new machining program obtained by setting appropriate tool paths according to the size of the new machine tool, and on the information indicative of the shape of the workpiece and that of the new machine tool. While the result of the simulation is being confirmed by a display and instruction means, if it has been determined that a desired shape may be obtained, the procedure returns to step S1 at which the present shape of the workpiece is prepared, and steps S2 to S5 are again successively executed. The display and instruction means is discussed later.

At step S8, based on control information on the waveform of a control current for the NC machine and the like, the machining status is checked or recognized to determine whether the machining conditions such as, for example, the initially set machining speed, discharge voltage, capacity of a capacitance, machining sequence and the like are suited for machining. At the same time, based on sound information indicative of machining sounds at the machining site, image information of the machine tool and the like, a determination is made whether the machine tool should be reshaped or the locus of machining should be modified in compliance with wear of the machine tool. If no abnormality has been recognized at step S8, the procedure returns to step S5 to continue the machining process control, whereas if an abnormality has been recognized, the machining status or the locus of machining is appropriately modified, followed by step S9 at which machining simulation is executed. Thereafter, an interrupt processing required to alter the machining sequence or the machining conditions is executed. The interrupt processing includes an interrupt required for optimization of the machining speed and an interrupt required to comply with the wear of the machine tool. This interrupt processing causes the procedure to return to step S2 at which a new machining program is prepared, and steps S4 and S5 are again executed.

In executing the simulation above, the information on the aforementioned machining conditions can be referred to. According to the present invention, upon review of the simulation result, if the progress of machining differs from the desired machining, the machining program is modified by again executing the modification procedure of loop LP1 or LP2 or by repeatedly executing such procedures. When the machining commands are prepared, because the operator can visually observe the progress of machining from the simulation result, the machining commands are generally determined in consideration of the observation result so as to minimize the excess thickness of the workpiece after the machining.

At step S10, recognition of the machining status is executed on real-time basis as to whether a serious situation such as damage to the machine tool occurs that requires interruption of the machining operation. If no abnormality has been confirmed, the machining process control is continued. In contrast, if an abnormality has been confirmed, an emergency interrupt processing is executed, and new machining commands such as, for example, a control suspension command are prepared.

At step S11, the control data used to control the machining process of step S5 are sent to the AI system and stored therein as process history information. By analyzing this process history information, rules relating to the machining process control can be acquired as knowledge data in which they are represented by "if-then-else" format, thus building up a knowledge data base. Preparation of a new machining program and simulation are executed at step S2 and at step S7 or S9, respectively, by making the knowledge base run on an AI inference system. This knowledge base is also used as reference information when the operator prepares or modifies machining programs.

If the machining status is acceptable, the machining operation is suspended, and the procedure advances to step S12 at which the furnished object is inspected.

Although not shown, the machining method of the present invention also includes the process of reshaping the machine tool, like ordinary machining methods. In this process, with reference to the machining status information obtained from the machining site and, particularly, to shape information of the workpiece and/or machine tool or control information indicative of the waveform of an electric current and the like, reshaping of the machine tool is executed.

Figure 4:
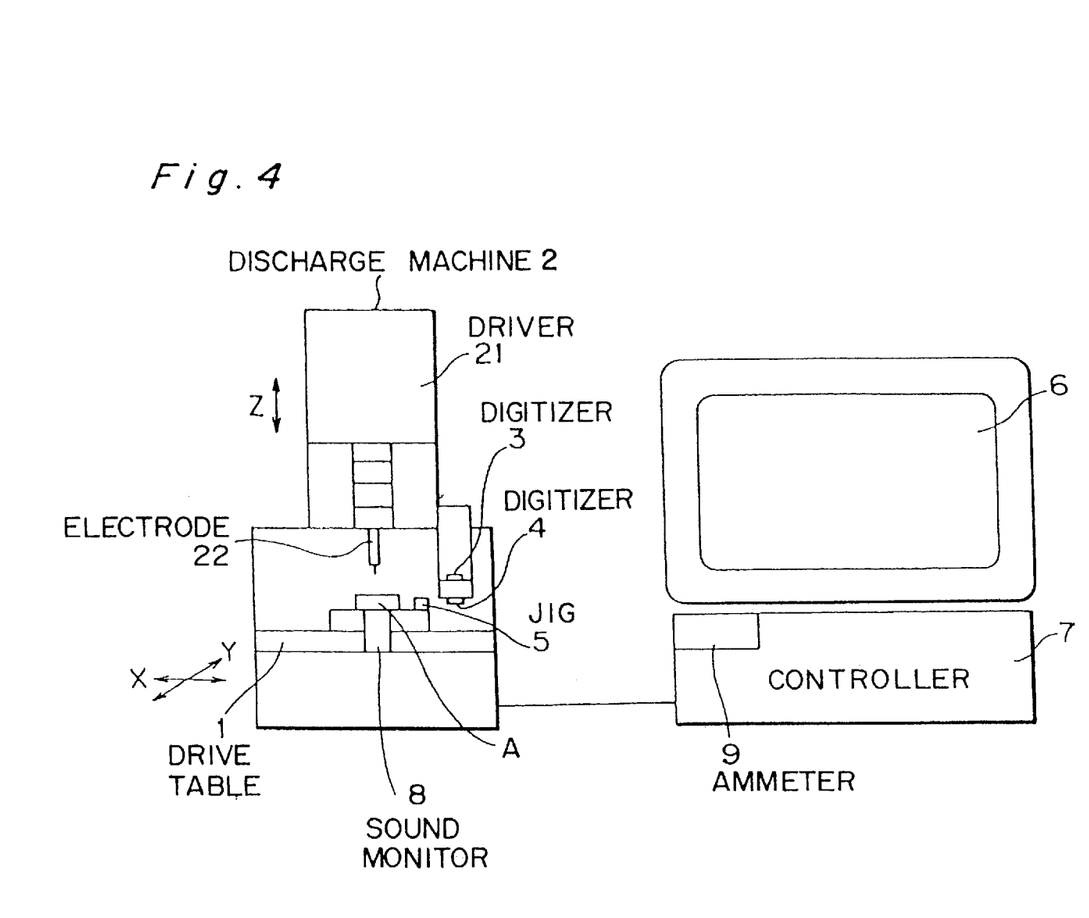
FIG. 4 is a schematic vertical view of an NC machine of the present invention.

FIG. 4 depicts an NC machine according to the present invention. This NC machine includes a drive table 1 capable of moving in the X- and Y-directions, an electrical discharge machine 2, a cylindrical electrode 22 employed as a machine tool for machining a workpiece A placed on the drive table 1, and a drive means 21 capable of moving in the Z-direction to drive the cylindrical electrode 22. Two 3-dimensional digitizers 3 and 4 are mounted on the drive table 1 to inspect the cylindrical electrode 22 and the workpiece A, respectively. A dressing jig 5 is mounted also on the drive table 1 to reshape the cylindrical electrode 22 based on the machining status information obtained from the machining site. A sound monitor 8 for detecting sound information at the machining site is disposed below the workpiece A.

The NC machine also includes an engineering workstation (EWS) 6 employed as the display and instruction means referred to above, and a control means 7 accommodating a control shell for collectively controlling all the elements of the NC machine. The control means 7 also accommodates an ammeter 9 for obtaining drive current information of the electrical discharge machine 2. The display and instruction means 6 has an instruction function in addition to a display function. Because of this, the display and instruction means 6 is capable of displaying CAD data, the machining conditions, the machining program, the machining site information, and the result of simulation, and is also capable of giving instructions to the control shell. The display and instruction means 6 may be a personal computer.

Figure 5:
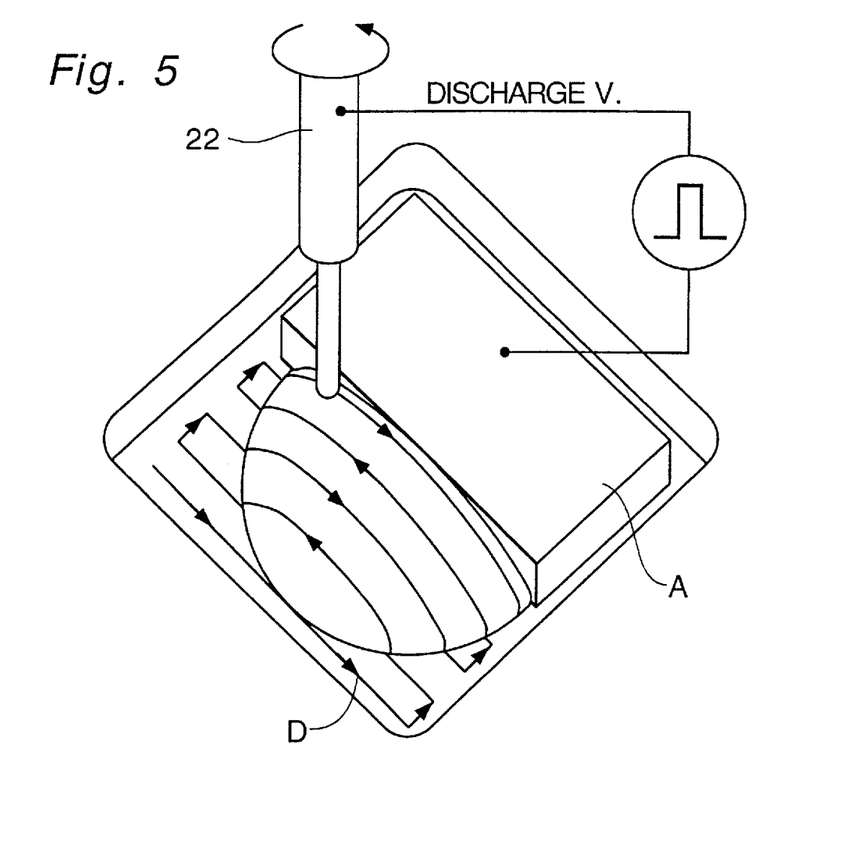
FIG. 5 is a perspective view of a workpiece and a machine tool.

As shown in FIG. 5, when the workpiece A placed on the drive table 1 is to be machined into a hemispherical configuration, a pulse-shaped discharge voltage is applied between the workpiece A and the cylindrical electrode 22. While the drive table 1 is being moved in the X-and Y-directions, the drive means 21 drives the cylindrical electrode 22 to rotate and move in the Z-direction, thereby moving the cylindrical electrode 22 in a direction indicated by D to accomplish a desired machining.

Specific machining processes of making a tiny involute gear having a pitch circle diameter of 0.30 mm and twelve teeth are explained hereinafter with reference to FIGS. 6A to 6D.

Figure 6A:
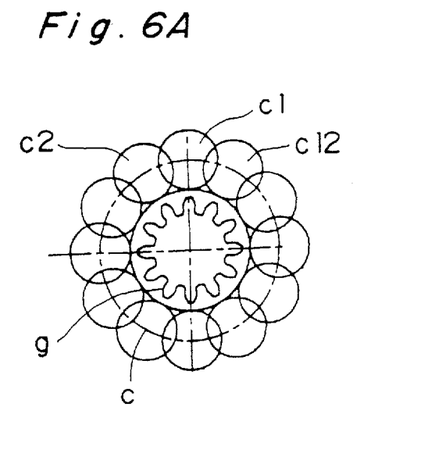
FIG. 6A is a schematic diagram illustrating the process of forming peripheral holes for the manufacture of an involute gear.
Figure 6B:
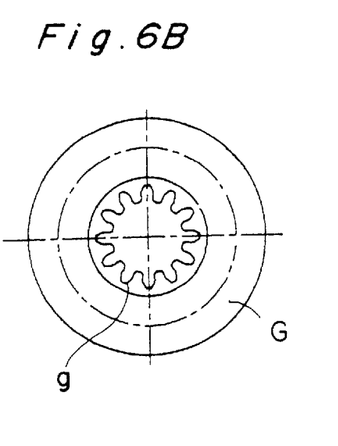
FIG. 6B is a schematic diagram illustrating trace machining.
Figure 6C:
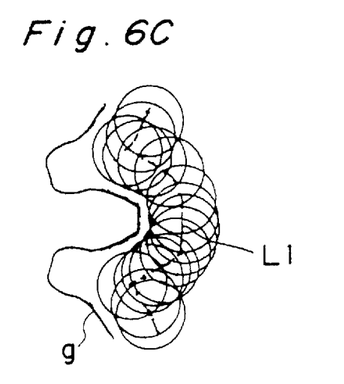
FIG. 6C is a schematic diagram illustrating rough machining.
Figure 6D:
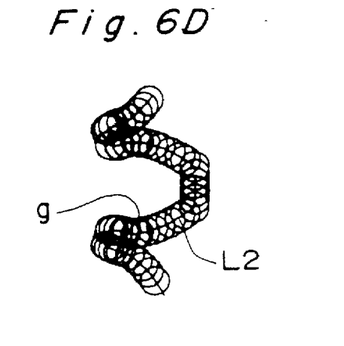
FIG. 6D is a schematic diagram illustrating finish machining.

A final shape g into which a workpiece A is to be machined and a plurality of, for example three, desired shapes as shown in FIGS. 6A to 6C in the course of machining are initially prepared. Based on the shapes prepared, a machining program and machining commands are prepared.

The workpiece A is then placed on the drive table 1, and a cylindrical electrode 22 having a diameter of 200 microns is mounted on the drive means 21 for subsequent drilling of a plurality of circularly arrayed holes shown in FIG. 6A. More specifically, in the machining process control, the cylindrical electrode 22 is placed in position so that its center may be located above a first position on a circle C having a diameter of 600 microns. The drive means 21 then drives the cylindrical electrode 22 to move downwards while rotating it, thereby forming a first hole c1 having a diameter of 200 microns at the first position. Thereafter, the drive means 21 drives the cylindrical electrode 22 to move upwards, and the workpiece A together with the drive table 1 is moved horizontally so that the cylindrical electrode 22 may be located above a second position on the circle C spaced 30° from the first position. A second hole c2 is then formed by moving the cylindrical electrode 22 downwards. The same operation referred to above is repeated twelve times until the drilling process shown in FIG. 6A is completed during which the plurality of circularly arrayed holes c1 to c12 are formed along the circle C.

Because these holes c1 to c12 form an annular groove having rugged vertical internal surfaces, the cylindrical electrode 22 is gradually rotated along the annular groove while being rotated on its own axis after the twelfth hole c12 has been formed, thereby forming an annular groove G having smooth vertical internal surfaces and a width of 200 microns, as shown in FIG. 6B (trace machining).

The trace machining is followed by a rough machining shown in FIG. 6C in which, upon replacement of the cylindrical electrode, a new cylindrical electrode 22 having a diameter of 50 microns is moved along a programmed machining locus L1 so that the final shape g of the intended involute gear may have an excess thickness. In a subsequent finish machining shown in FIG. 6D, upon replacement of the cylindrical electrode, a cylindrical electrode 22 having a diameter of 20 microns is moved along a programmed machining locus L2 until the intended involute gear is obtained.

Figure 7:
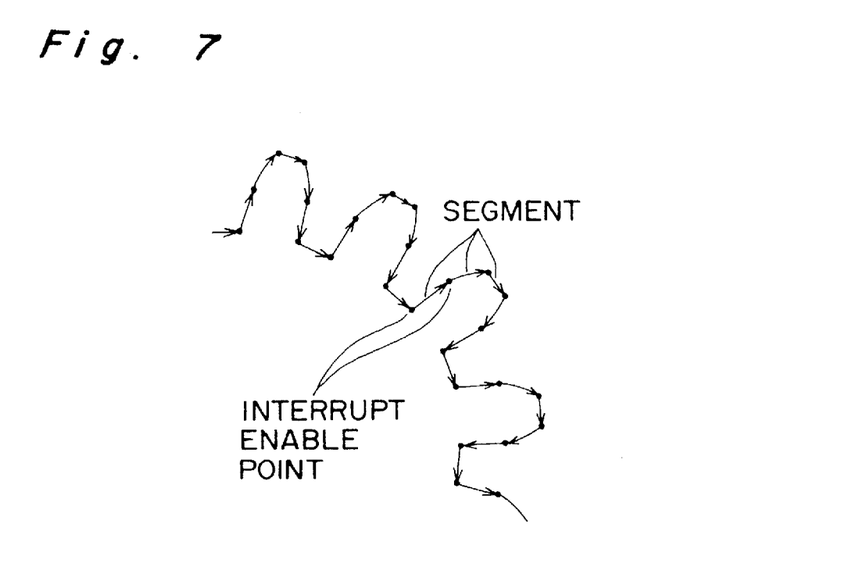
FIG. 7 is a schematic diagram illustrating segmentation required to allow interrupt operations.

It is to be noted here that, as shown in FIG. 7, the final shape g of the involute gear is made up of a plurality of continuous wire frame elements, each of which is divided into a plurality of segments to permit an interrupt processing for each segment. In the machining processes shown in FIGS. 6A to 6D, recognition of the shapes during machining (step S6 in FIG. 2) and recognition of the machining status (steps S8 and S10 in FIG. 2) are executed. As occasion demands, simulations (steps S7 and S9 in FIG. 2) and associated interrupt processings are executed.

It is also to be noted that all the processes can be sequentially automatically executed by executing the electrode reshaping process prior to each machining operation.

The involute gear thus obtained has a machining accuracy of ±0.5 μm and the machining time thereof is reduced to about one tenth compared with the conventional method.

Figure 8:
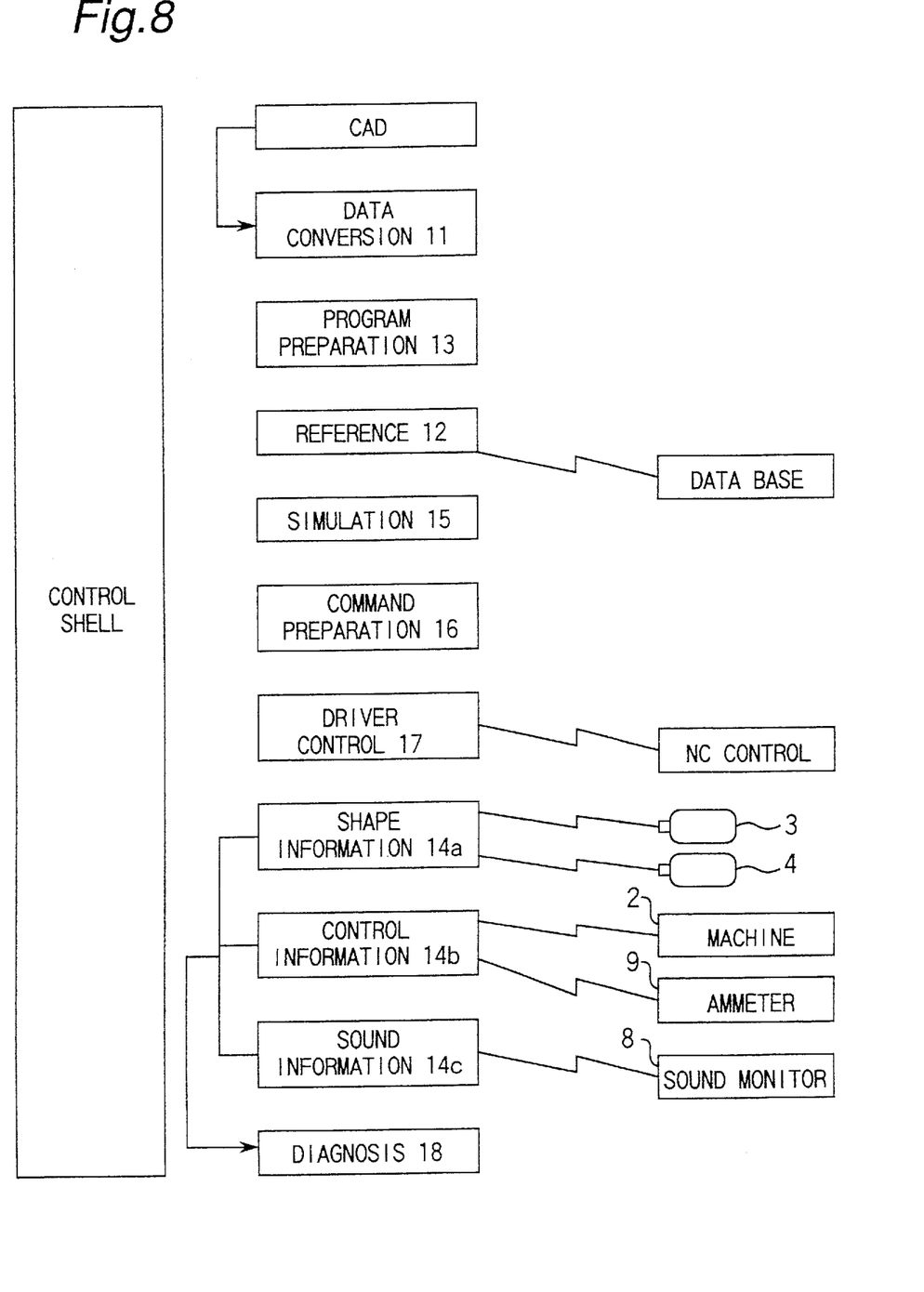
FIG. 8 is a block diagram illustrating the operation of a control shell mounted in the NC machine of FIG. 4.

The control shell is a multitasking control shell including, as shown in FIG. 8, a task 11 of converting the design data obtained by CAD into information required for NC control, a task 12 of referring to the machining condition information stored in advance in the data base, and a task 13 of preparing the machining program based on the machining condition information and the NC control information converted. The control shell also has tasks 14a, 14b and 14c of obtaining the machining status information at the machining site and a task 15 of simulating the machining status based on the machining status information and the machining program prepared. The control shell also includes a task 16 of preparing machining commands for NC control based on the result of simulation and the machining program, a task 17 of controlling the drive means in compliance with the machining commands, and a task 18 of diagnosing abnormal conditions during machining based on the machining status information.

In order to execute the tasks 14a, 14b and 14c, the NC machine is provided, as discussed previously, with the two 3-dimensional digitizers 3 and 4 for obtaining shape information of the cylindrical electrode 22 and the workpiece A, respectively, the ammeter 9 for obtaining drive current information of the electrical discharge machine 2, and the sound monitor 8 for detecting sound information at the machining site. The 3-dimensional digitizers 3 and 4 may be replaced by video cameras, laser microscopes, or the like.

As is clear from the above, according to the present invention, because fine machining is carried out with a numerical control having a computer-aided simulation function, the progress of machining can be visually observed even with respect to very small workpieces having a size less than one millimeter, and the machining processes can be easily modified in the course of machining. Also, the progress of machining can be determined from machining sounds, if necessary. Because of this, the method and apparatus of the present invention enable the operator to appropriately judge the degree of progress of machining, and to advance the machining while teaching the operation, thus greatly enhancing the accuracy of machining.

As a result, the method and apparatus of the present invention bring about the following effects:

(a) Even if a change in the progress of machining occurs under the influence of very small substances such as, for example, crystalline particles of the workpiece or impurities, such a change can be readily modified.

(b) The machining can be advanced so as not to cause any changes in the machining status.

(c) The most advantageous machining method in respect to time and cost can be designed.

In addition to these effects, the operator can grasp the progress of machining with reference to image information or, in some cases, sound information. This implies that the method and apparatus of the present invention provide the operator with a desired working atmosphere that allows interactive processings between the operator and the machining apparatus.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A method of finely machining a workpiece with use of a numerical control having a computer-aided simulation function, said method comprising the steps of:

(a) preparing a machining program based on design data obtained by CAD and machining conditions stored in advance in a data base;

(b) obtaining machining status information from a start of machining up to a present time from a machining site, said machining status information including at least one of sound information obtained from the machining site, information indicative of a drive current required to drive an NC machine, information indicative of a shape of the workpiece, and information indicative of a shape of a machine tool;

(c) simulating a machining status based on the machining program and the machining status information to predict a result of machining;

(d) outputting the result of said simulating;

(e) determining whether or not the result of said simulating is within a permissible range;

(f) obtaining information on another machine tool from a data base if the result of said simulating is not within the permissible range;

(g) preparing machining commands based on the machining program and the result of said simulating; and (h) executing an NC control based on the machining commands to optimize a remainder of the machining of the workpiece, wherein steps (b) to (h) are executed during a machining of the workpiece.

2. The method according claim 1, wherein said preparing of the machining program is further based on machining status information from the machining site.

3. The method according to claim 2, wherein said preparing of the machining program is performed so as to minimize an excess thickness on the workpiece that requires further machining by referring to at least one of tool shape information employed as one of the machining conditions and 2-dimensional information plus predetermined depth information indicative of the shape of the workpiece during machining.

4. The method according to claim 2, wherein said preparing of the machining program is performed so as to minimize an excess thickness on the workpiece that requires further machining by referring to at least one of tool shape information employed as one of the machining conditions and 3-dimensional information indicative of the shape of the workpiece during machining.

5. The method according to claim 1, and further comprising a step of diagnosing abnormal conditions based on the machining status information obtained from the machining site.

6. The method according to claim 1, and further comprising a step of reshaping a machine tool based on the machining status information obtained from the machining site.

7. An apparatus for finely machining a workpiece with use of a numerical control having a computer-aided simulation function, said apparatus comprising:

an NC machine having a machine tool for machining a workpiece;

a drive means mounted in said NC machine for driving said machine tool;

an NC control means for controlling said drive means;

a control shell for collectively controlling said machine tool, said drive means, and said NC control means, and for simulating a machining status during machining to predict a result of machining, determining whether or not the result of the simulating is within a permissible range obtaining information on another machine tool from a data base if the result of the simulating is not within the permissible range preparing machining commands based on the machining program and the result of the simulating, and executing an NC control based on the machining commands to optimize a remainder of machining; and a display and instruction device for selectively displaying design data obtained by CAD, machining conditions, a machining program, machining status information obtained from a start of machining up to a present time at a machining site, the result of the simulating executed by said control shell, and instructions given to said control shell, wherein the machining status information includes at least one of sound information obtained from the machining site, information indicative of a drive current required to drive said NC machine, information indicative of a shape of the workpiece, and information indicative of a shape of said machine tool;

wherein said control shell further controls said display and instruction device.

8. The apparatus according to claim 7, wherein said control shell is a multitasking control shell having a task of converting the design data obtained by CAD into NC control information, a task of referring to machining condition information stored in advance in a data base, a task of preparing the machining program based on the machining condition information and the NC control information, a task of obtaining the machining status information from the machining site, a task of simulating a machining status based on the machining status information and the machining program, a task of preparing machining commands required for NC control based on a result of simulation and the machining program, and a task of controlling said drive means in accordance with the machining commands.

9. The apparatus according to claim 8, wherein said control shell has a task of diagnosing abnormal conditions during machining based on the machining status information.

10. The apparatus according to claim 7, and further comprising a reshaping means for reshaping said machine tool based on the machining status information obtained from the machining site.

11. The apparatus according to claim 7, and further comprising at least one of a sound monitor for detecting sound information at the machining site, an ammeter for obtaining drive current information of said drive means, and a shape recognition means for obtaining shape information indicative of at least one of said workpiece and said machine tool.

12. A method for machining a workpiece at a machining site using an NC machine and a machine tool, said method comprising:

preparing a machining program based on CAD data and machining conditions stored in a database;

generating numerical control data based on said machining program;

controlling machining of the workpiece according to said numerical control data using the NC machine;

obtaining, during said controlling of the machining, actual machining status information from the machining site;

determining whether said actual machining status information is within a permissible range;

continuing said controlling of the machining according to said numerical control data if said actual machining status information is determined to be within the permissible range; and performing a modification procedure if said actual machining status information is determined not to be within the permissible range;

wherein said modification procedure includes generating simulated machining status information by performing a machining simulation based on said machining program and a modification of said actual machining status information, determining whether said simulated machining status information is within the predetermined range, if said simulated machining status information is determined to be within the predetermined range, generating new numerical control data based on said machining program and said simulated machining status information and continuing said controlling of the machining according to said new numerical control data, and if said simulated machining status information is determined not to be within the predetermined range, repeating said modification procedure based on a further modification of said actual machining status information until said simulated machining status information is within the predetermined range.

13. The method as claimed in claim 12, wherein said actual machining status information includes at least one of:

sound information obtained from the machining site;

information indicative of a drive current of the NC machine;

information indicative of a shape of the workpiece;

information indicative of a shape of the machine tool; and information indicative of a progress of the machining.

14. The method as claimed in claim 12, wherein said modification procedure further comprises:

fetching information on a shape of a new machine tool from a database before said generating of simulated machine status information;

wherein said generating of simulated machine status information is performed based on a new machining program obtained according to the information on the shape of the new machine tool and said generating of new numerical control data is based on the new machining program and said simulated machining status information.

15. The method as claimed in claim 12, further comprising:

recognizing said actual machining status information on a real-time basis;

determining whether an abnormality exists based on said recognizing of said actual machining status information; and     executing an emergency interrupt processing if an abnormality is determined to exist.

16. The method as claimed in claim 12, further comprising:

reshaping the machine tool based on said actual machining status information.

* * * * *